(12) United States Patent
Tajan et al.

(10) Patent No.: US 9,896,189 B2
(45) Date of Patent: Feb. 20, 2018

(54) PROPELLER BLADE PIVOT

(71) Applicant: SNECMA, Paris (FR)

(72) Inventors: Sebastien Tajan, Sucy en Brie (FR); Adrien Jacques Philippe Fabre, Montrouge (FR); Christophe Jacquemard, Hericy (FR); Adrien Laurenceau, Melun (FR); Romain Boudier, Viroflay (FR)

(73) Assignee: SNECMA, Paris (FR)

( * ) Notice: Subject to any disclaimer, the term of this patent is extended or adjusted under 35 U.S.C. 154(b) by 348 days.

(21) Appl. No.: 14/279,727

(22) Filed: May 16, 2014

(65) Prior Publication Data

US 2014/0341739 A1 Nov. 20, 2014

(30) Foreign Application Priority Data

May 17, 2013 (FR) ...................................... 13 54427

(51) Int. Cl.
*B64C 11/32* (2006.01)
*B64C 11/06* (2006.01)
*B64C 11/34* (2006.01)
*B64D 27/00* (2006.01)
*F01D 7/02* (2006.01)

(52) U.S. Cl.
CPC ............ *B64C 11/325* (2013.01); *B64C 11/06* (2013.01); *B64C 11/346* (2013.01); *F01D 7/02* (2013.01);

(Continued)

(58) Field of Classification Search
CPC ...... Y02T 50/66; Y02T 50/672; Y02T 50/673; F05D 2260/77; F05D 2260/78;
(Continued)

(56) References Cited

U.S. PATENT DOCUMENTS 3,321,023 A     5/1967  Russell et al.
5,263,898 A  *  11/1993  Elston, III ............. B64C 11/06
                                                  416/129

(Continued)

FOREIGN PATENT DOCUMENTS

FR      2 957 329 A1    9/2011
GB        630195       10/1949

OTHER PUBLICATIONS

Definition of arm; Printed Oct. 26, 2016.*
(Continued)

*Primary Examiner* — Kevin Murphy
*Assistant Examiner* — Kelsey Cary
(74) *Attorney, Agent, or Firm* — Oblon, McClelland, Maier & Neustadt, L.L.P.

(57) ABSTRACT

The invention relates to the field of aerial propellers, in particular the field of variable-pitch propellers, specifically for unducted fans. More specifically, the invention relates to a pivot (15) for a blade (14) of a propeller (3a, 3b), the pivot including at least a proximal portion (15a) made of metal and suitable for being retained in a radial orifice of a propeller hub, while being capable of turning in said orifice about a longitudinal axis (Z) of the pivot (15), and a distal portion (15b) including a receptacle (20) suitable for retaining a blade root, and at least one arm (17) of organic matrix composite material extending laterally relative to said longitudinal axis (Z) and supporting a flyweight (16).

5 Claims, 5 Drawing Sheets

(52) U.S. Cl.
CPC .... *B64D 2027/005* (2013.01); *F05D 2260/77* (2013.01); *F05D 2260/78* (2013.01); *Y02T 50/66* (2013.01); *Y02T 50/672* (2013.01); *Y02T 50/673* (2013.01)

(58) Field of Classification Search
CPC ......... F01D 7/02; B64C 11/325; B64C 11/06; B64C 11/346; B64D 2027/005
USPC ......... 416/147, 204 R, 219 R, 134 R, 134 A, 416/209, 205
See application file for complete search history.

(56) References Cited

U.S. PATENT DOCUMENTS

| | | | |
|---|---|---|---|
| 8,348,619 B2* | 1/2013 | Derclaye | F01D 5/3038 416/193 A |
| 2005/0129520 A1* | 6/2005 | Harper | F01D 5/26 416/204 R |
| 2009/0060745 A1* | 3/2009 | Douguet | F01D 5/3007 416/219 R |
| 2010/0003139 A1* | 1/2010 | Loos | B64C 11/306 416/147 |
| 2012/0020796 A1 | 1/2012 | Carre et al. | |
| 2013/0011259 A1 | 1/2013 | Balk et al. | |
| 2014/0212292 A1* | 7/2014 | Xu | F01D 5/30 416/193 A |

OTHER PUBLICATIONS

French Preliminary Search Report dated Jan. 27, 2014 in French Application 13 54427, filed on May 17, 2013 ( with English Translation of Categories of Cited Documents).

* cited by examiner

PROPELLER BLADE PIVOT

BACKGROUND OF THE INVENTION

The present invention relates to the field of aerial propellers, and more particularly to a propeller blade pivot.

In the present context, the term "aerial propeller" is used broadly to cover any device having at least one profiled blade suitable for rotating about a propulsion axis in order to accelerate a mass of air along the direction of said propulsion axis so as to generate thrust in the opposite direction by reaction. The term thus covers, amongst other things, conventional aviation propellers, and also turbojet fans, including unducted or open rotor fans. Typically, such unducted fans comprise two contrarotating variable-pitch propellers.

Typically, a variable-pitch propeller includes a pivot at the base of each blade to enable the blade to turn about its longitudinal axis. The pivot may be incorporated in the root of the blade or it may be detachable from the blade, thereby making it easier to replace blades and helping to reduce repair and maintenance costs.

Ideally, variable-pitch propellers include devices that act automatically to enable them to be feathered in the event of the engine stopping. In particular, when the blades are feathered, the relative wind can still exert an aerodynamic torque on each blade about its longitudinal axis. In order to oppose that aerodynamic torque and keep the blades in a feathered orientation, one of the simplest devices known to the person skilled in the art comprises a flyweight at the end of a lever arm that extends laterally relative to said longitudinal axis, and perpendicularly to the pressure and/or suction faces of the blade. The centrifugal force exerted on each flyweight by the propeller rotating serves to maintain the blade in the feathered orientation. In order to limit their size, such flyweights and lever arms are typically incorporated in the pivot of each blade. French patent FR 2 957 329 discloses an unducted fan turbojet having two contrarotating propellers in which the pivot of each blade has a device of that type for holding the blades in the feathered position.

Aerial propellers, and more particularly unducted fan propellers that are normally driven by free turbines of the turbojet, can rotate at speeds that are very high, thereby generating large traction forces on the pivots. The pivots are typically made of metal and they are dimensioned to withstand such loads, and consequently they are of considerable weight.

OBJECT AND SUMMARY OF THE INVENTION

The present invention description seeks to reduce the weight of propeller blade pivots, and in particular of a pivot of a propeller blade having at least a proximal portion suitable for being retained in a radial orifice of a propeller hub while allowing the blade to turn in said orifice about a longitudinal axis of the pivot, together with a distal portion including a receptacle suitable for retaining a blade root, and also at least one arm extending laterally relative to said longitudinal axis and supporting a flyweight.

In at least one embodiment, the object of obtaining a pivot of relatively reduced weight is obtained by the fact that at least said proximal portion is made of metal, whereas at least said arm is made of an organic matrix composite material. Since the arm is stressed mainly in bending during operation of the propeller, using organic matrix composite materials for making this member enables a significant saving in weight to be obtained for mechanical properties that are comparable or superior.

In order to ensure that forces are taken up in the connection with the blade root and in order to avoid force peaks in the composite material, which peaks could in particular give rise to delamination phenomena, said receptacle for receiving the blade root is made of metal.

In a first alternative, the receptacle may be formed in a metal insert that is incorporated in the distal portion of the pivot. In particular, the metal insert may be incorporated in a preform for the distal portion of the pivot before curing a thermosetting resin that impregnates the preform in order to form the matrix of an organic matrix composite material. Nevertheless, in an alternative, it is also possible to envisage integrating the metal insert in the distal portion of the pivot after the resin has been cured. In order to transmit forces between the proximal and distal portions of the pivot, they may be bonded together by adhesive or by a bolted connection, for example.

In a second alternative, the receptacle may be formed in a metal extension of the proximal portion of the pivot, so as to facilitate the transmission of traction forces through the pivot. In particular, this metal extension may pass through the distal portion of the pivot, thereby making it easier to integrate the distal and proximal portions. In order to retain the distal portion of the pivot better against centrifugal forces while the propeller is rotating, the metal extension of the extension of the proximal portion of the pivot may present a longitudinal section that diverges towards a distal end of the pivot, thereby taking up the centrifugal forces by interlocking shapes.

The receptacle for receiving the blade root may be in the form of a slot of dovetail section oriented in a direction that is substantially perpendicular to the at least one arm. Thus, the blade root, which presents a section complementary to the dovetail section of the slot, can easily be inserted in or extracted from the receptacle along the direction of said slot, the dovetail section of the slot serving to retain the blade against centrifugal forces while the propeller is rotating. The pivot may also include releasable latches enabling the blade root to be prevented from moving in the slot once it has been inserted.

The pivot may include two opposite arms extending laterally relative to said longitudinal axis and each supporting a respective flyweight. By distributing the flyweights over two opposite arms, it is possible to reduce the bending load on each arm significantly, thereby enabling the total weight to be reduced.

The invention also provides a variable-pitch propeller comprising a hub, a plurality of such pivots radially received in the hub, and a blade fastened to each pivot, and the invention also relates to a fan, in particular an unducted fan comprising at least one such propeller. The fan may in particular comprise two contrarotating propellers, each having such pivots. Furthermore, the invention also relates to a turbojet having such a fan, and to an aircraft propelled by at least one such turbojet.

BRIEF DESCRIPTION OF THE DRAWINGS

The invention can be well understood and its advantages appear better on reading the following detailed description of several embodiments given as non-limiting examples. The description refers to the accompanying drawings, in which.

DETAILED DESCRIPTION OF THE INVENTION

Figure 1:
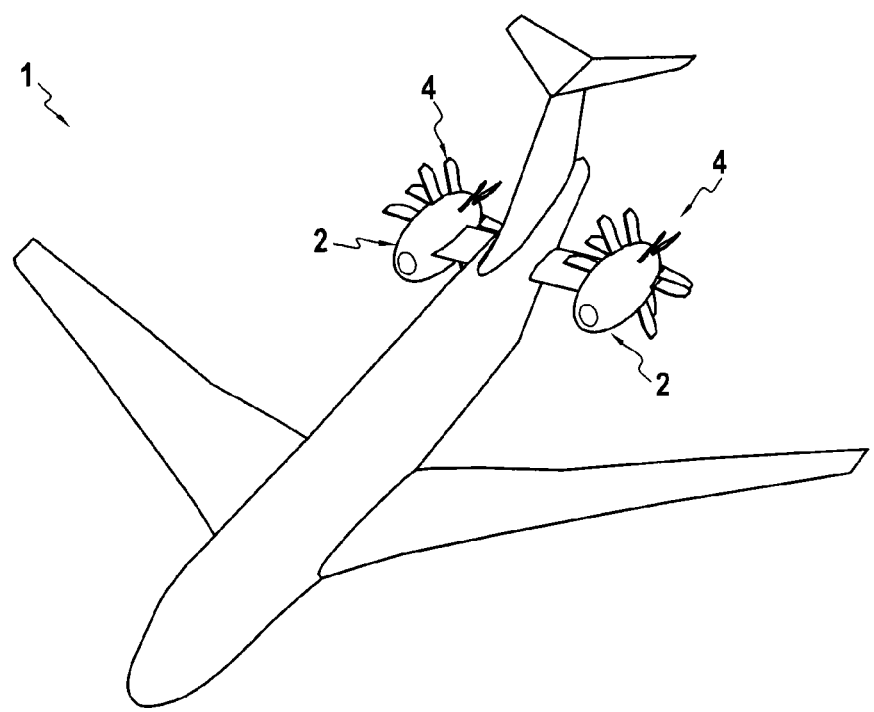
FIG. 1 is a diagram of an aircraft propelled by turbojets with unducted fans.

Turbojets having an unducted fan, also known as an open rotor, are very advantageous for propelling aircraft because of their high fuel efficiency. FIG. 1 shows an aircraft 1 with two turbojets 2 with unducted fans 3 in the "pusher" position.

Figure 2A:
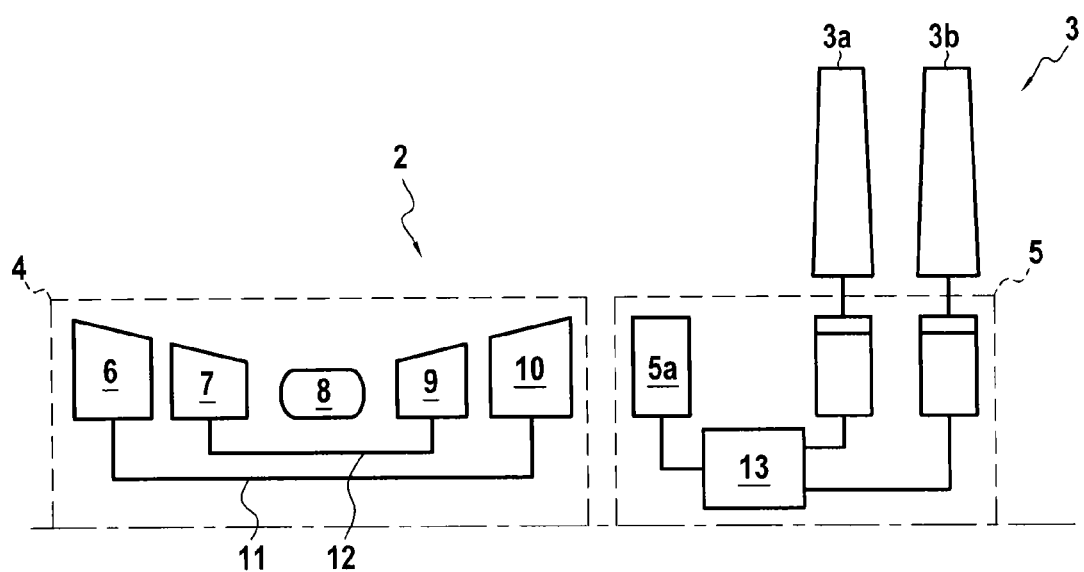
FIGS. 2A and 2B are diagrammatic longitudinal section views of two variants of unducted fan turbojets, each having two variable-pitch contrarotating propellers.
Figure 2B:
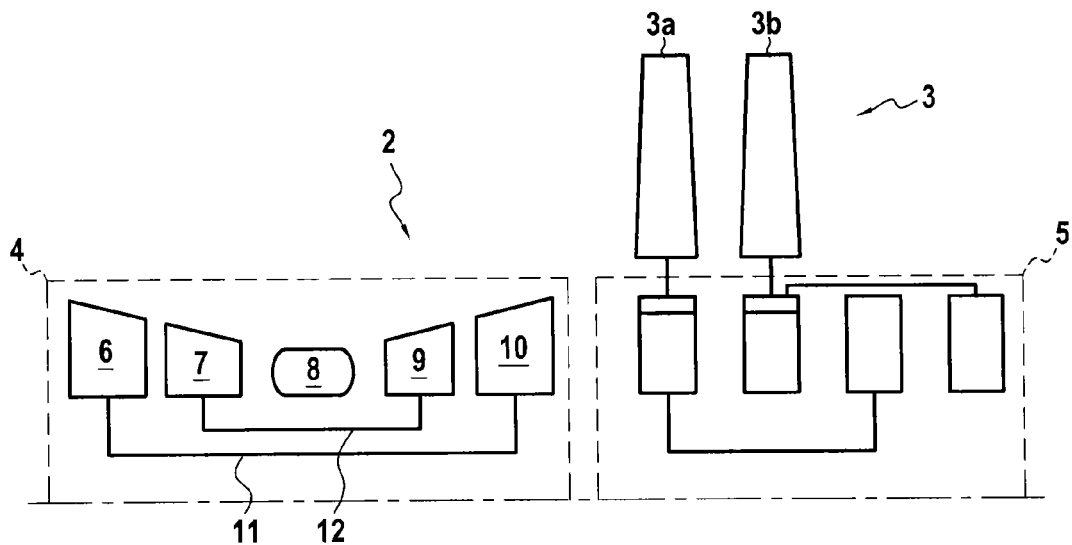

As shown in FIGS. 2A and 2B, such a turbojet 2 with an unducted fan 3 comprises a gas generator 4 and an unducted fan 3 coupled to a high pressure turbine 5 downstream from the gas generator 4. In the two examples shown, the gas generator 4 comprises a first compressor stage 6, a second compressor stage 7, a combustion chamber 8, a first high pressure turbine stage 9, and a second high pressure turbine stage 10. The first compressor stage 6 and the second high pressure turbine stage 10 are coupled together in rotation by a first shaft 11, while the second compressor stage 7 and the first high pressure turbine stage 9 are coupled together in rotation by a second shaft 12 mounted coaxially around the first shaft 11. Thus, in operation, air entering via an upstream inlet of the first compressor stage 6 is compressed in succession in the first and second compressor stages 6 and 7 prior to reaching the combustion chamber 8, into which fuel is injected and burnt. The hot gas resulting from this combustion is then expanded in succession in the first and second high pressure turbine stages 9 and 10 in order to drive the compressor stages 6 and 7. Because of the heat energy imparted to this gas by the combustion, the combustion gas nevertheless remains sufficiently energetic downstream from the second high compressor turbine stage 10 to drive a low pressure turbine 5 that drives the unducted fan 3.

FIGS. 2A and 2B show two alternative arrangements for driving the unducted fan 3. In both arrangements, the unducted fan 3 has two contrarotating propellers 3a and 3b on the same axis. Nevertheless, in the first variant, shown in FIG. 2A, the two propellers 3a and 3b are coupled via a common speed-reducing gearbox 13 to at least one stage 5a of the low pressure turbine 5, whereas in the second variant, as shown in FIG. 2B, each of the two propellers 3A and 3B is driven directly by a respective stage of the low pressure turbine 5, and they are not coupled to each other. In the second arrangement, the propellers 3a and 3b can normally reach high speeds of rotation, thereby generating large centrifugal forces, in particular at the root of each blade of the propellers 3a and 3b.

Figure 3:
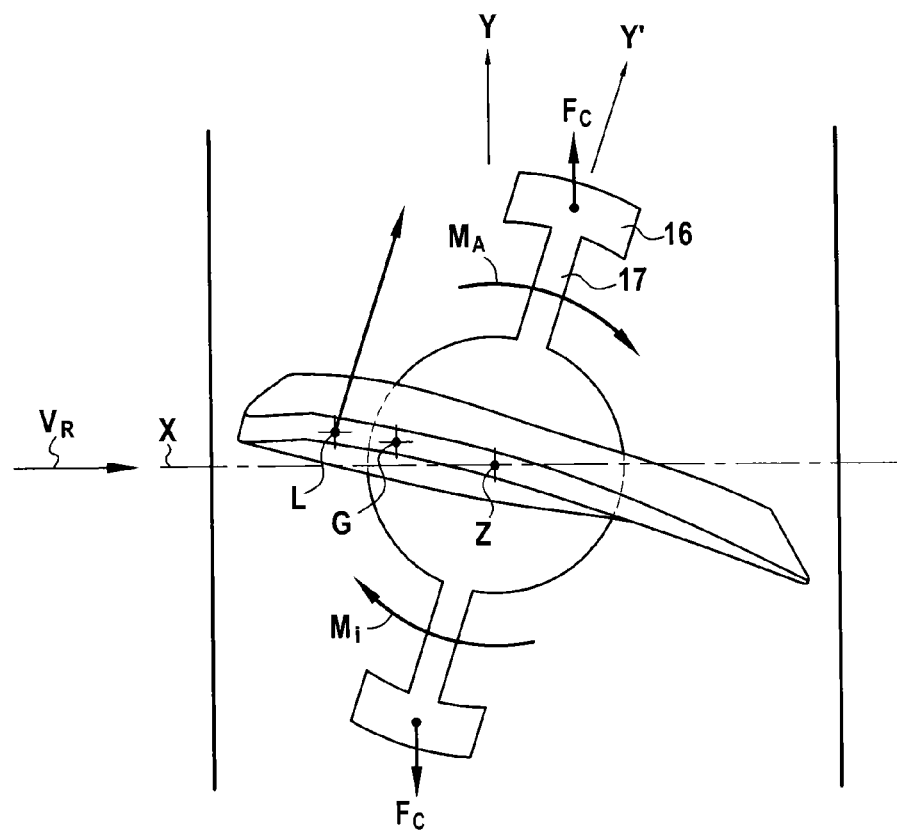
FIG. 3 is a diagram showing the operation of a pivot including flyweights for keeping a variable-pitch propeller blade feathered against an aerodynamic torque caused by relative wind.

In both of the variants shown, the propellers 3a and 3b are variable-pitch propellers, i.e. each blade can pivot about a longitudinal axis in order to adapt the orientation of the leading edge of the blade to the engine speed and/or to commands from the pilot. For this purpose, each blade 14 is mounted on a pivot 15, as shown in FIG. 3. In particular, in the event of an engine failure, it is advantageous for the blade 14 to be feathered, i.e. to have an angle of attack that is substantially zero relative to the relative wind $v_r$. It is thus possible to prevent the relative wind causing the propeller to turn, since that leads to additional drag and can even cause the propeller to be subjected to overspeed with negative consequences for the structural integrity of the turbojet 1 as a whole.

It is particularly desirable for each propeller 3a, 3b to include passive means for keeping each blade 14 feathered even in the event of a failure of devices for varying the pitch of the propeller, which devices are typically hydraulic or electrical. The center of thrust L of each blade 14 may be offset relative to the pivot axis Z of the pivot 15, thereby generating an aerodynamic torque $M_a$ tending to cause the blade 14 to pivot. In addition, an inertial torque $M_i$ is also generated, because of the center of gravity G of the blade 14 being offset from the pivot axis Z. To oppose these torques $M_a$ and $M_i$ and to keep the blade 14 feathered, flyweights 16 are suspended from arms 17 that extend laterally relative to the pivot axis Z. The orientation of these arms 17 is substantially perpendicular to the pressure and suction sides of the blade 14 such that when the propeller 3a, 3b is rotating about its axis of rotation X, the centrifugal forces $F_c$ acting on the flyweights 16 tend to bring the main direction Y' of the arms 17 into alignment with a direction Y that is tangential relative to the propeller 3a, 3b, thereby opposing the aerodynamic and inertial torques $M_a$ and $M_i$ and bringing the blade back into alignment with the direction of the relative wind $v_r$.

Figure 4:
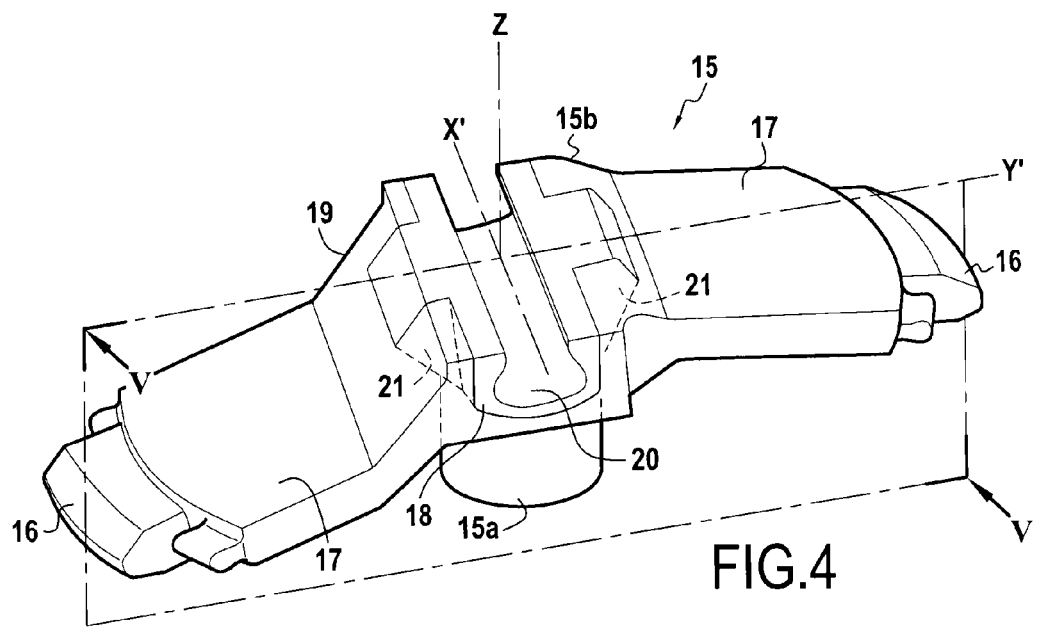
FIG. 4 is a perspective view of a variable-pitch propeller blade pivot in a first embodiment of the invention.

FIG. 4 shows a propeller blade pivot 15 in a first embodiment of the invention. This pivot 15 comprises a proximal portion 15a and a distal portion 15b. The proximal portion 15a is made of metal. More specifically, in the example shown, this proximal portion 15a is made of light metal alloy. It is substantially axisymmetric in shape with radial shoulders, so as to enable it to be inserted in a radial orifice of a propeller hub, and so as to enable it to be retained in the orifice while allowing the pivot 15 to turn relative to the orifice about the pivot axis Z.

In a first embodiment, the distal portion 15b of the pivot 15 comprises a metal extension 18 of the proximal portion 15a. This extension 18 is formed integrally with the proximal portion 15a and is received in a central orifice passing through a part 19 made of organic matrix composite material. This composite part 19 includes the arms 17 having the flyweights 16 mounted at the ends thereof. The organic matrix composite material of this part 19 comprises fibers embedded in an organic matrix, and more specifically in a polymer matrix. The fibers may in particular be carbon fibers, although it is also possible to envisage using other types of fiber, such as for example: glass fibers; polyamide fibers; or polyethylene fibers. These fibers may be arranged in unidirectional layers or in layers that are woven in two-dimensions, and they may be laminated, or alternatively they may be three-dimensionally woven. In order to take up bending forces better on the arms 17, these fibers may be oriented mainly along the direction of the arms 17, at least in the proximity of the bottom faces of the arms 17. The fibers are embedded in an organic matrix, more specifically a polymer matrix, which may in particular be constituted by a thermosetting resin, such as an epoxy resin, or some other thermosetting resin that is better adapted to high temperatures. The composite part 19 may be formed by resin transfer molding or by laminating fiber layers that have been pre-impregnated with resin.

As can be seen in FIG. 4, the metal extension 18 of the proximal portion 15*a* of the pivot 15 is flush with the distal end of the pivot 15. It presents a receptacle 20 in the form of a slot of rounded dovetail cross-section oriented along a direction X' that is substantially perpendicular to the pivot axis Z and to the main direction Y' of the arms 17 for the purpose of receiving the root of the blade 14 (drawn in dashed lines). After the blade root has been inserted in this receptacle 20 along the direction X' of the slot, it can be prevented form moving in this direction by transverse latches (not shown) in the receptacle 20. The dovetail section of the receptacle 20 serves to take up centrifugal forces exerted on the blade 14 along the direction of the pivot axis Z, while coupling the blade 14 to the pivot 15 for turning about the pivot axis Z.

Figure 5:
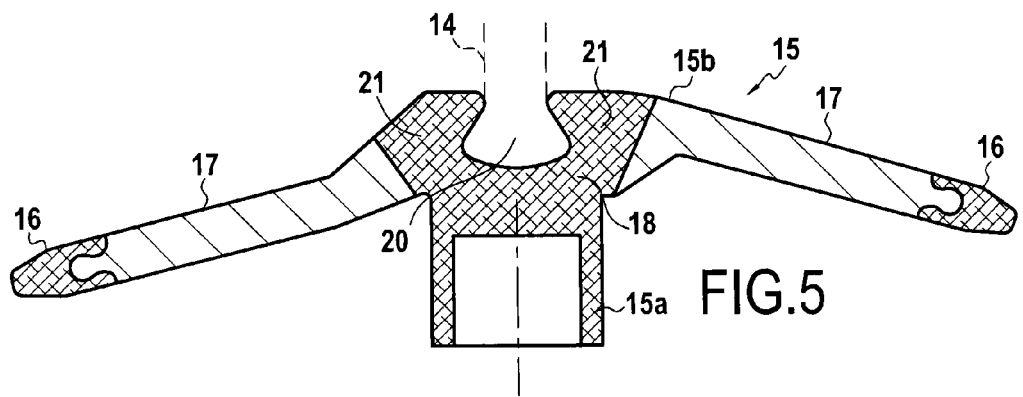
FIG. 5 is a longitudinal section view of the FIG. 3 pivot on plane V-V.

The metal extension 18 presents two lateral protuberances 21 extending in the main direction Y' of the arms 17. These two opposite protuberances 21 are of a shape such that said metal extension 18 presents a longitudinal section in the plane V-V shown in FIG. 5 that diverges towards the distal end of the pivot 15. Thus, these lateral protuberances 21 form shoulders that by interlocking shapes are suitable for taking up centrifugal forces along the direction of the pivot axis Z as transmitted by the arms 17 when the propeller 3*a*, 3*b* is rotating.

Figure 6:
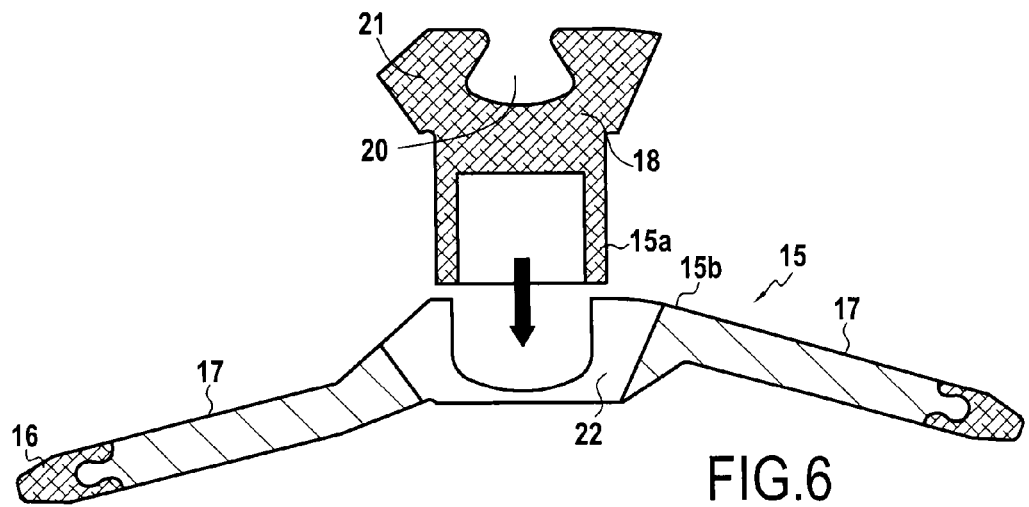
FIG. 6 shows a step in assembling the FIG. 3 pivot.

FIG. 6 shows how the composite part 19 is assembled with the proximal portion 15*a* of the pivot 15 and shows its metal extension 18 for forming the pivot 15 in this first embodiment. At this stage of assembly, the proximal portion 15*a* of the pivot 15 is inserted through the orifice 22 into the composite part 19 until the lateral protuberances 21 of the metal extension 18 come to bear against complementary inside surfaces of the orifice 22. A layer of adhesive between the outside surfaces of the metal extension 18 and the inside surfaces of the orifice 22 serves to provide adhesion between the metal extension 18 and the composite part 19.

Figure 7:
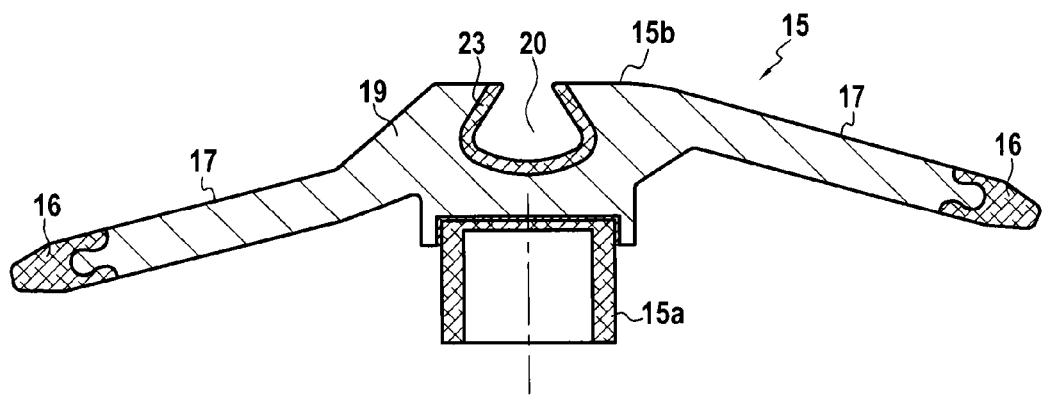
FIG. 7 is a longitudinal section view of a variable-pitch propeller blade pivot in a second embodiment of the invention.

FIG. 7 shows a second embodiment in which the proximal portion 15*a* of the pivot 15 does not have a metal extension passing through the top portion 15*b*. This embodiment also presents a receptacle 20 in the form of a slot of rounded dovetail cross-section extending along a direction X' substantially perpendicular to the pivot axis Z and to the main axis Y' of the arm 17, for the purpose of receiving the root of the blade 14. Nevertheless, this receptacle 20 is formed in a metal insert 23 incorporated in the composite part 19 without any direct contact with the bottom portion 15*a* of the pivot. The remaining elements of the pivot 15 are nevertheless analogous to those of the first embodiment and consequently they are given the same reference numbers in the drawings. In this second embodiment, the metal proximal portion 15*a* of the pivot 15 and the composite part 19 are bonded together by adhesive.

Figure 8:
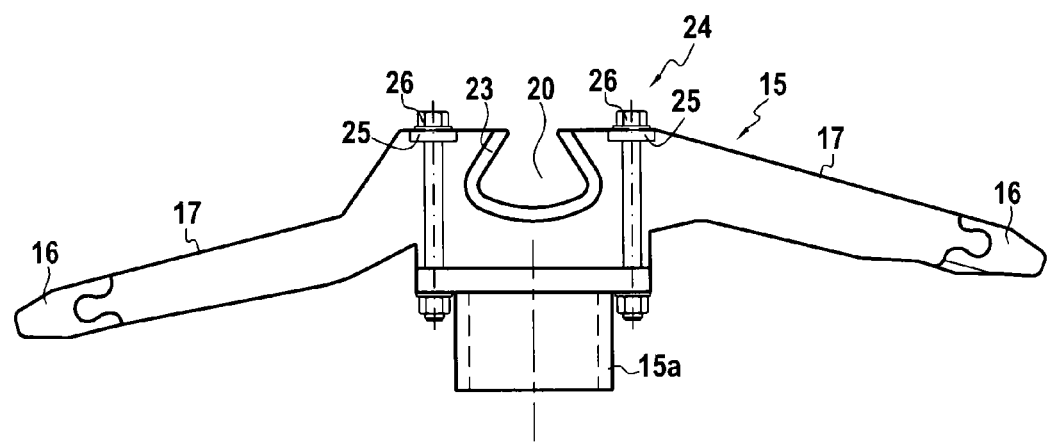
FIG. 8 is a side view of a variable-pitch propeller blade pivot in a third embodiment of the invention.

FIG. 8 shows a third embodiment similar to the second, but in which the proximal portion 15*a* of the pivot 15 and the composite part 19 are bonded together by a bolted connection 24 formed by a plate 25 bearing against the distal end of the pivot 15, and by bolts 26 connecting the plate 25 to the metal proximal portion 15*a*. The remaining elements of this pivot 15 are nevertheless analogous to those of the second embodiment and consequently they are given the same reference numbers in the drawings.

Figure 9:
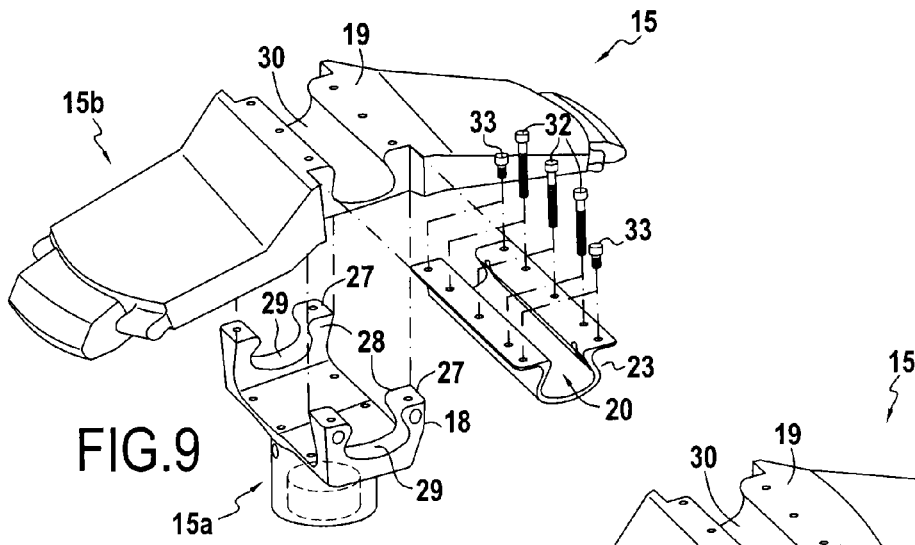
FIG. 9 is an exploded perspective view of a variable-pitch propeller blade pivot in a fourth embodiment.

FIG. 9 shows a fourth embodiment in which the proximal portion 15*a* of the pivot 15 presents, as in the first embodiment, a metal extension 18 passing through the composite part 19 in the distal portion 15*b*. Nevertheless, in this fourth embodiment, the receptacle 20 for receiving the root of the blade 14 is not formed directly in this metal extension 18, but rather in a metal insert 23 similar to the insert of the second and third embodiments. In addition, in this fourth embodiment, the metal insert 23 contributes together with bolts 32 and 33 to provide the mechanical connection between the proximal portion 15*a* with its mechanical extension 18 and the composite part 19 of the distal portion 15*b* of the pivot 15. This composite part 19 is received in a concave portion of the metal extension 18 that is open in the distal direction. The contact surfaces between the metal extension 18 and the composite part 19 presents a shape that is suitable for co-operating to provide blocking between them in a plane that is substantially perpendicular to the pivot axis Z. Thus, in the embodiment shown, the shoulders 27 prevent the composite part 19 from moving relative to the metal extension 18 in the main direction Y' of the arms 17, whereas other shoulders 28 that are perpendicular prevent the composite part 19 from moving relative to the metal extension 18 in the main direction X' of the slot in the receptacle 20. Inside surfaces 29 and 30 respectively of the metal extension 18 and of the composite part 19 together form a groove 31 of rounded dovetail cross-section receiving the metal insert 23, which itself presents a cross-section complementary to that of the groove 31 and thus forms between them a latch providing interacting shapes that prevent movement in the direction of the pivot axis Z. For this purpose, these surfaces 29 and 30 are substantially in mutual alignment along the direction X' and they are spaced apart on either side of a plane that is perpendicular or oblique relative to this direction X'. Finally, bolts 32 and 33 finish off making the connection between the metal extension 18, the composite part 19, and the insert 23. The first bolt 32 directly connects the insert 23 to the metal extension 18 outside the shoulders 28, while the second bolt 33 connects the insert 23 to the proximal portion 15*a* via through orifices in the composite part 19 between the shoulders 28. The remaining elements in FIG. 9 correspond to analogous elements in the above-described embodiments and consequently they are given the same reference numbers.

Figure 10:
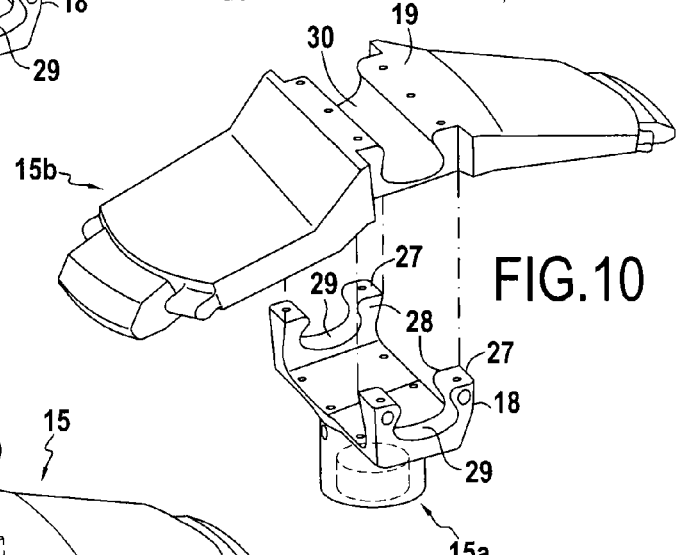
FIG. 10 shows a first step in assembling the FIG. 9 pivot.
Figure 11:
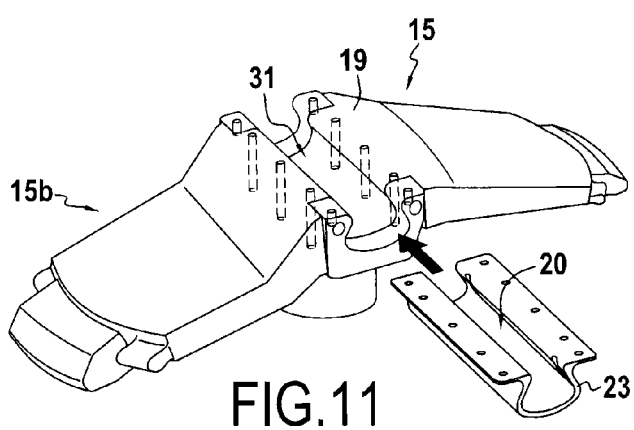
FIG. 11 shows a second step in assembling the FIG. 9 pivot.
Figure 12:
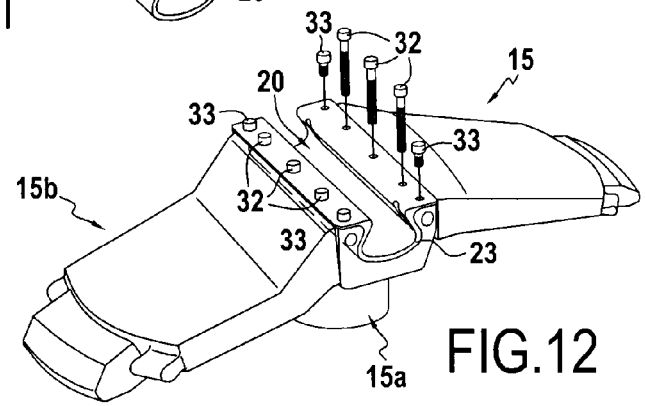
FIG. 12 shows a third step in assembling the FIG. 9 pivot.

FIG. 10 shows a first step in assembling the pivot 15 in this fourth embodiment. In this first step, the composite part 19 with fibers that may be oriented mainly in the main direction Y' of the arms 17, is received in the concave portion in the distal end of the metal extension 18 and is prevented from moving in the plane perpendicular to the pivot axis by the shoulders 27 and 28. Thereafter, in a second step shown in FIG. 11, the insert 23 is slid along the direction X' in the groove 31. The dovetail shape of the cross-section of the this groove 31 then provides interacting shapes that prevent relative movement along the direction of the pivot axis Z between the insert 23 and each of the surfaces 29, 30 forming the groove 31. Finally, in a third step shown in FIG. 12, the bolts 32 and 33 are inserted and tightened in the corresponding orifices, so as to retain the insert 23 in the groove 31.

Although the present invention is described above with reference to specific embodiments, it is clear that various modifications and changes may be made to these embodiments without going beyond the general ambit of the invention as defined by the claims. In addition, individual characteristics of these various embodiments described may be combined in additional embodiments. Consequently, the description and the drawings should be considered in a sense that is illustrative rather than restrictive.

The invention claimed is:

1. A pivot for a blade of a propeller, the pivot comprising:
a proximal portion suitable for being retained in a radial orifice in a propeller hub while being capable of turning in the orifice about a longitudinal axis of the pivot; and
a distal portion including at least one arm extending laterally relative to said longitudinal axis and supporting a flyweight at an end of said at least one arm furthest from said longitudinal axis;
wherein at least said proximal portion is made of metal, at least said at least one arm is made of organic matrix composite material, and a receptacle for retaining a blade root is formed in a metal extension of the proximal portion of the pivot that passes through the distal portion of the pivot and presents a longitudinal section that diverges towards a distal end of the pivot to retain along the longitudinal axis, by interlocking shapes, the distal portion of the pivot.

2. The pivot according to claim 1, wherein said proximal and distal portions are bonded together by adhesive.

3. The pivot according to claim 1, wherein said proximal and distal portions are bonded together by a bolted connection.

4. The pivot according to claim 1, wherein said receptacle is in the form of a dovetail slot extending in a direction that is substantially perpendicular to said at least one arm.

5. The pivot according to claim 1, wherein said distal portion comprises two opposite arms extending laterally relative to said longitudinal axis and each supporting a respective flyweight.

* * * * *